Aug. 15, 1939.  E. G. ULRICH  2,169,508
TRUCK ANCHOR
Filed Oct. 1, 1937   3 Sheets-Sheet 1
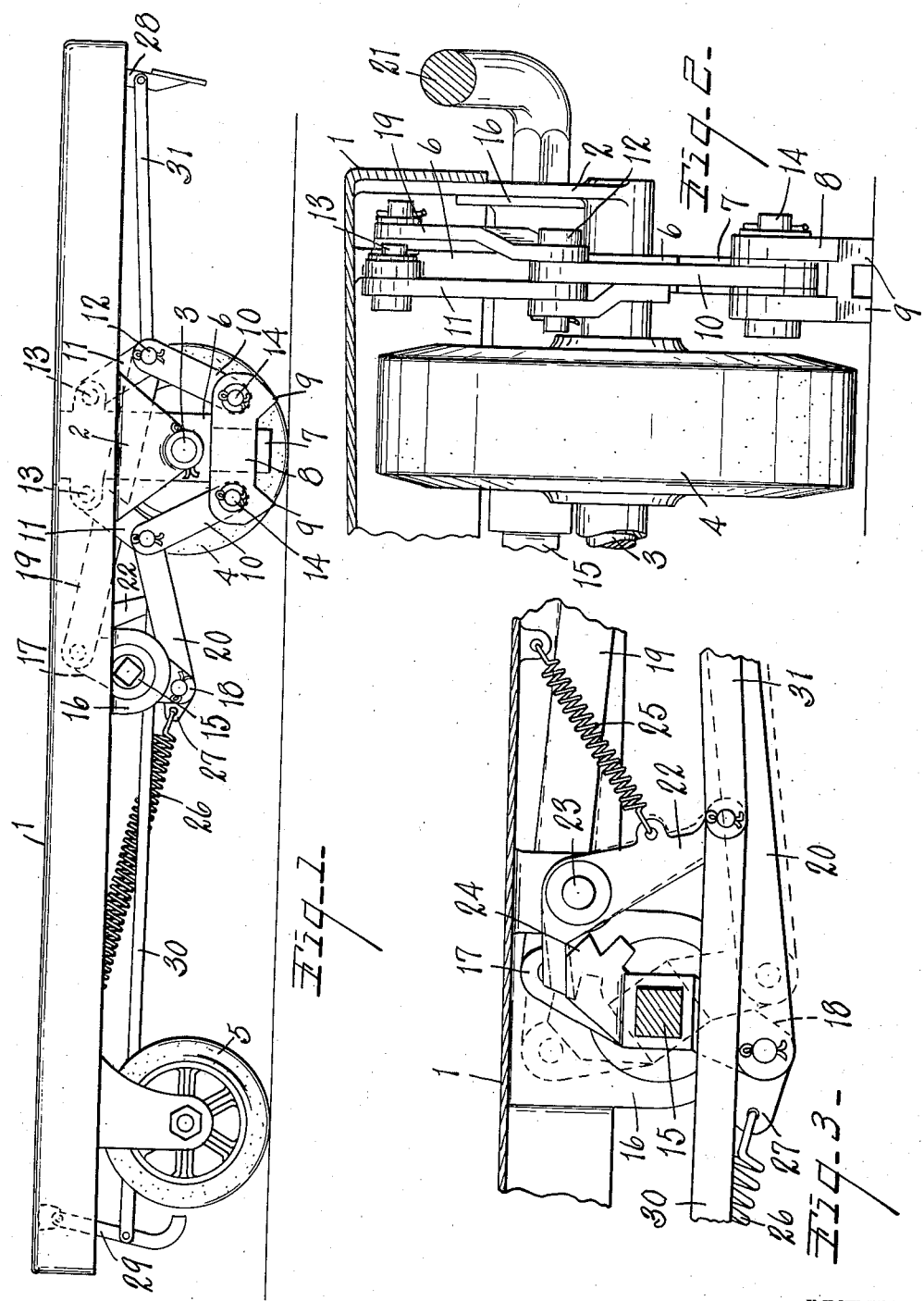
INVENTOR.
Emery G. Ulrich
BY Earl & Chappell
ATTORNEYS Aug. 15, 1939.  E. G. ULRICH  2,169,508
TRUCK ANCHOR
Filed Oct. 1, 1937  3 Sheets-Sheet 2
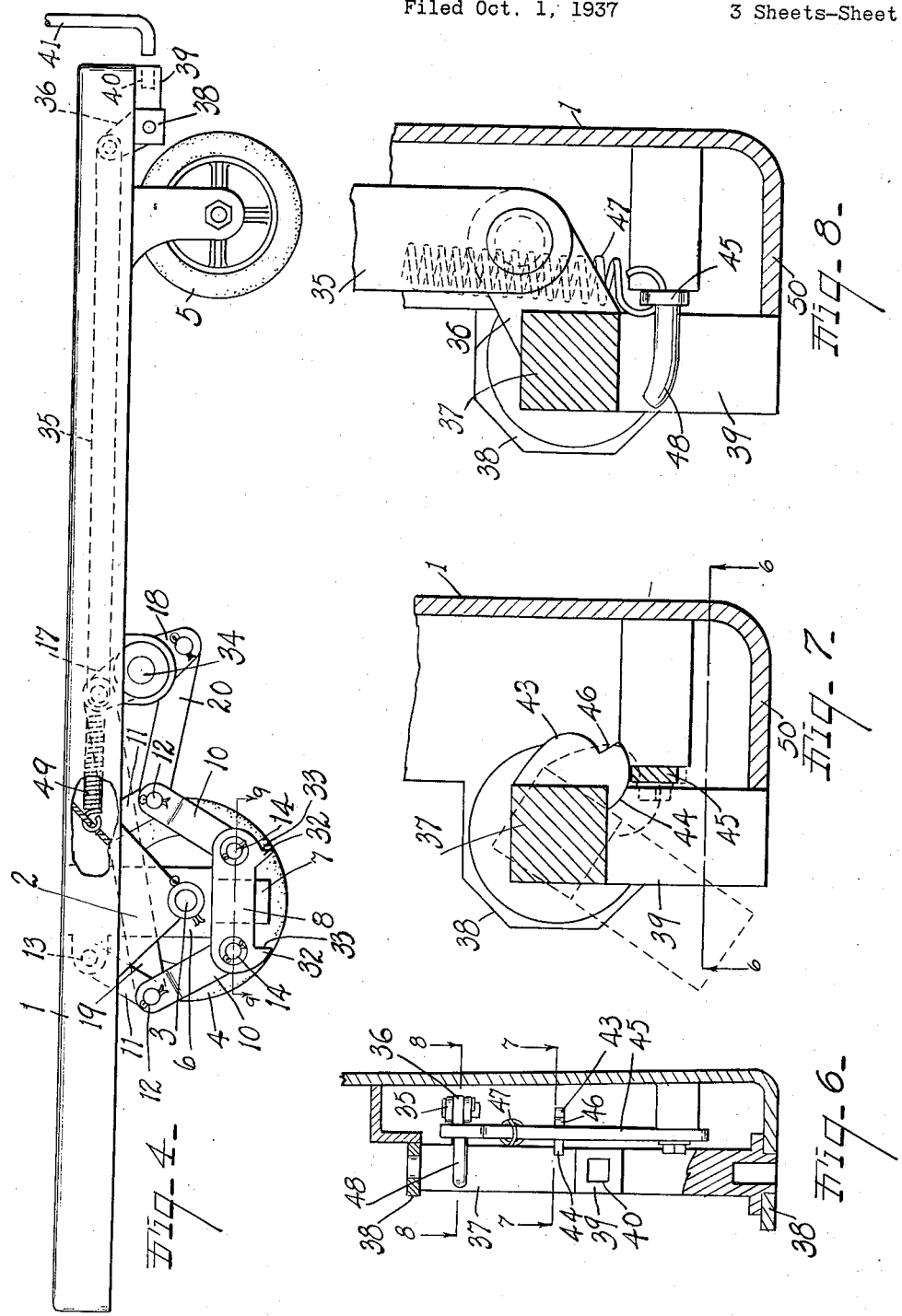
INVENTOR.
Emery G. Ulrich
BY Earl & Chappell
ATTORNEYS

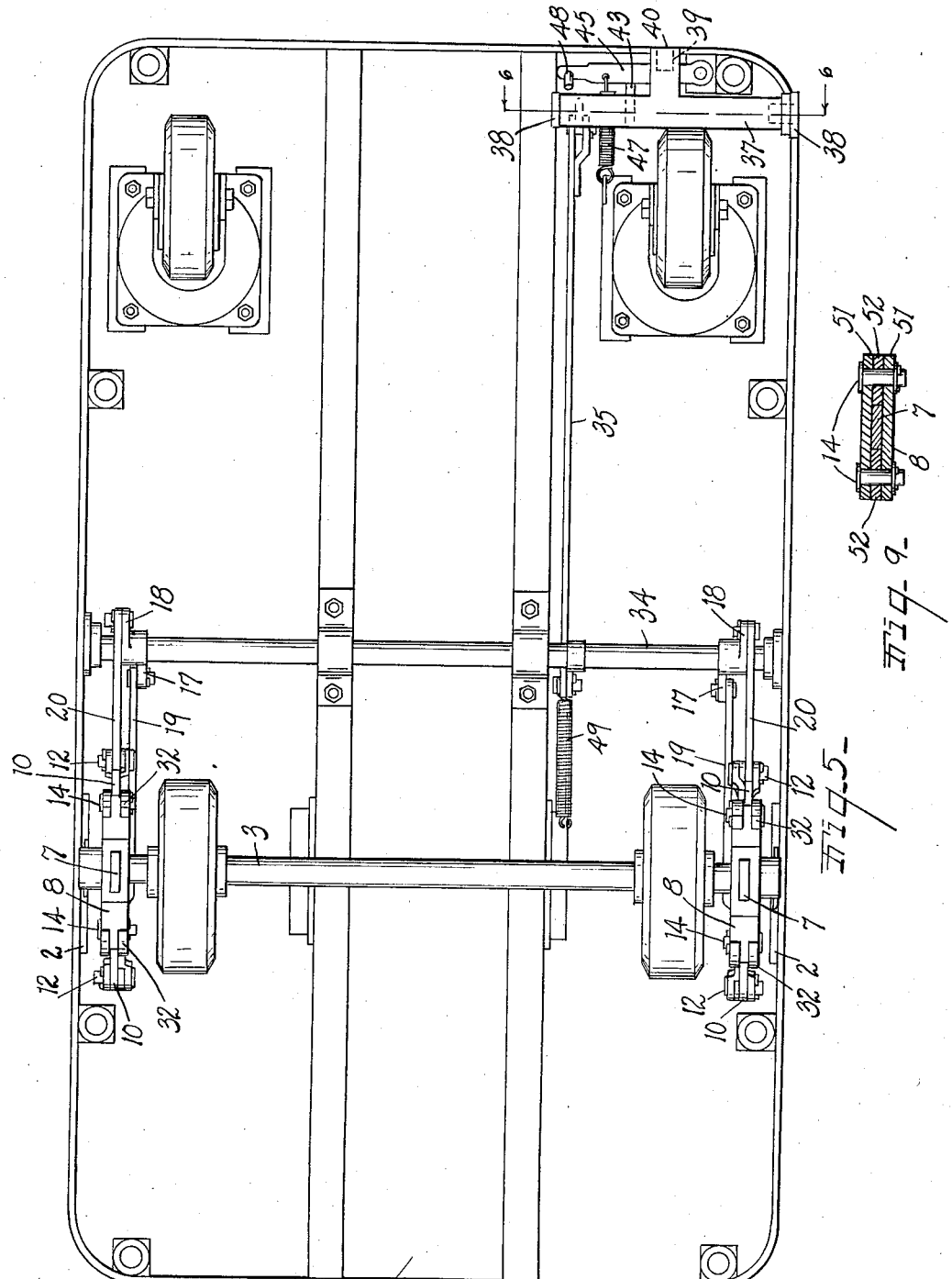

Patented Aug. 15, 1939

2,169,508

UNITED STATES PATENT OFFICE 2,169,508

TRUCK ANCHOR

Emery G. Ulrich, Lakewood, Ohio

Application October 1, 1937, Serial No. 166,824

12 Claims. (Cl. 188—7)

This invention relates to improvements in truck anchors.

My present invention relates to truck anchors of the type shown in my Patent No. 2,020,386 issued November 12, 1935, being particularly applicable to freight house and warehouse trucks designed for moving freight and merchandise and trucks which may be used in the shipment of freight in freight cars, avoiding the necessity of unloading the trucks, the trucks being firmly anchored in the freight cars.

The main objects of this invention are:

First, to provide a structure having the above mentioned advantages which is quite simple and economical in its parts and at the same time is strong and rigid, and very durable in structure.

Second, to provide a truck anchor which may be quite easily manipulated to anchor the truck, even when carrying a very heavy load, and is also easily manipulated to release the anchor from either end of the truck.

Further objects pertaining to details and economies of my invention will definitely appear from the description to follow. The invention is defined in the claims.

My improvements are preferably embodied in freight and warehouse trucks of the trailer type and provided with coupling means at the ends whereby they may be coupled together in a train or coupled to a tractor. In the accompanying drawings I have shown no couplers but a highly satisfactory coupler is shown in my application for patent on coupler filed concurrently herewith.

A structure embodying my invention is clearly illustrated in the accompanying drawings, in which:

Fig. 1 is a side elevation of a truck embodying the features of my invention, the actuating crank being omitted.

Fig. 2 is an enlarged detail view partially in vertical transverse section.

Fig. 3 is a detail view partially in longitudinal section.

Fig. 4 is a view in side elevation of a truck embodying a modified form of my invention.

Fig. 5 is a bottom plan view of the truck, further illustrating details of the modification of Fig. 4.

Fig. 6 is an enlarged fragmentary view in vertical section, further illustrating details of the construction in Figs. 4 and 5.

Fig. 7 is an enlarged fragmentary view in section on line 7—7 of Fig. 6.

Fig. 8 is an enlarged fragmentary view in section on line 8—8 of Fig. 6.

Fig. 9 is a view in section on a line corresponding to line 9—9 of Fig. 4, illustrating a modified form of foot block which may be employed in the structure of my invention.

In the embodiments illustrated in the accompanying drawings, the body 1 of the truck is shown more or less conventionally. Hangers 2 carry the axle 3 for a pair of carrying wheels 4, only one of which is illustrated. A pair of caster wheels 5 are also provided, only one of the caster wheels being illustrated. It will be understood that I have illustrated only such parts as seem to me to be proper to show a practical embodiment of my invention.

I operatively associate with each of the pair of carrying wheels 4 an anchoring jack which is adapted to lift the wheels from the platform or floor of a freight car or the like and anchor the truck in its set position. These jacks, only one of which is illustrated, comprise the depending standard 6 having a reduced lower end portion 7 on which the foot block 8 is mounted for vertical reciprocating movement. The foot block 8 is provided with platform or floor engaging toothlike projections 9 at each end thereof. It will be noted that the standard is supported in the vertical plane of the axle which is passed through the standard.

The foot block is supported and actuated by opposite pairs of toggle links 10 and 11, these pairs of links being pivotally connected to each other at 12. The link 11 is pivotally connected to the standard at 13 while the link 10 is pivotally connected to the foot block at 14. A rockshaft 15 is supported in suitable hangers 16 in parallel relation to the axle and has opposed arms 17 and 18. The arm 17 is connected by the link 19 to the toggle pivot 12 of one pair of toggle links while the link 20 is connected to the pivot 12 of the other pair of toggle links.

With this arrangement, when the rockshaft is actuated in counter-clockwise direction as viewed in Fig. 1, a push or thrust is imparted to the link 20 and a pull on the link 19. This straightens or actuates the toggle and forces the foot block downwardly, lifting the load from the wheel. The anchoring prongs on the foot block securely engage the surface such as the platform or floor of a freight car, a loading platform, or the like.

The rockshaft is designed to receive the crank 21 which may, of course, be of suitable length to provide power, but it will be understood that, as the links straighten or move to load lifting position, very powerful action results, so that a very heavy load may be raised by a single operator. The parts may be proportioned so that when in actuated position the pivots 12 swing slightly past the vertical plane through the pivots 13 and 14 so that the load tends to lock the parts, but this is not an essential and in the embodiment illustrated other means are provided for locking the load in elevated position.

This locking means consists of the locking dog 22 pivoted at 23 to coact with the keeper 24 on the rockshaft, the dog being actuated by the spring 25 so that as the rockshaft is swung in counter-clockwise direction, as stated, the dog engages the keeper, thus locking the anchoring jack in its extended or actuated position. The coiled spring 26 is pivoted to the truck body and to the ear 27 on one arm of the rockshaft so that the spring acts to break the toggle and to hold the foot block in elevated position. I preferably provide means for releasing the dog from both ends of the truck body. This means consists of the push lever 28 at on end of the truck body and the pull lever 29 at the other end. These levers are connected by the links 30 and 31 to the lower end of the dog or holding pawl 22, as shown in Fig. 3, so that the dog may be manually released to transfer the load from the anchoring jack to the carrying wheel 4.

This arrangement of parts provides a very simple and effective means for anchoring the trucks and one which is easily operated, both to effect the anchoring and to release the anchor.

In Figs. 4 to 8, inclusive, I illustrate a modified embodiment of my invention which, insofar as the structure of the foot block and toggle actuating means therefor is concerned, is similar to that illustrated in Figs. 1, 2 and 3. The parts are therefore designated by similar reference characters. However, I would point out that the tooth-like projections illustrated in Figs. 4 and 5 and indicated by the reference numeral 32 are more pointed in shape, i. e., have a vertical face 33 enabling the projections to embed themselves somewhat in the supporting surface and effectively prevent movement of the truck when they are engaged.

The modification of Figs. 4 to 8, inclusive, embodies a rockshaft 34 similar to rockshaft 15, with the exception that no provision need be made for rocking the same at that point, inasmuch as further means to be hereinafter described are utilized for this purpose. However, it will be appreciated from the description to follow that if it is desired to furnish means coaxial with the rockshaft for actuating the same, such means may be provided.

The present embodiment concerns itself with means for elevating the truck by the foot blocks 8 from an end of the truck or from a side thereof adjacent said end and for locking the elevating means in operative position. Means are likewise provided for readily and quickly unlocking the said means. In general the provisions of the modified form are characterized by all of the advantages of the structure illustrated in Figs. 1, 2, and 3, namely, the capability of the same to be actuated and released readily and quickly by a single individual and in actuated position to effectively hold the truck against movement.

For the purpose of actuating the toggles, I employ an elongated draft link 35 pivotally connected to the arm 17 at one end and to a further arm 36 at the other end, which arm is connected, preferably integrally, to a stub actuating rockshaft 37 of square section journaled in brackets 38. The shaft 37 need not extend the full width of the truck, inasmuch as power transmitted to rockshaft 34 through link 35 is applied to the toggle mechanisms on either side of the truck.

From the foregoing it will be apparent that when rockshaft 37 is turned in clockwise direction as viewed in Figs. 4, 7 and 8 the toggles will be straightened and the truck elevated on foot blocks. In order to rotate the rockshaft, I provide an extension 39 integral therewith and extending at right angles thereto, said extension having an opening 40 therein for the reception of a suitable operating handle or bar 41. If desired a square opening 42 may be formed in an end of the said rockshaft for the reception of a suitable crank similar to that insertable in rockshaft 15, whereby the rockshaft 37 may be rotated.

For the purpose of retaining the rockshaft from return movement once the same has been actuated to elevate the truck, I employ a latch member 43 preferably integral with the said rockshaft 37 (see Figs. 6 and 7), the said member having a rounded cam surface 44 engageable with a pivoted latch keeper 45 and provided with a pawl or dog 46 engageable with the said keeper to lock the rockshaft 37 in rotated position. Spring 47 connected to one end at a suitable point on the frame and at the other end to pivoted keeper 45 serves to engage the keeper against dog 46 after the keeper has been swung outwardly by the cam surface 44. Accordingly, with dog 46 in engagement with keeper 45, the truck is maintained in elevated position and shifting thereof is effectively prevented.

When it is desired to release the toggles and return the truck to position in which it is supported on its wheels, a hand or finger piece 48 on latch keeper 45 is grasped by the operator to pull the keeper outwardly and disengage the same from dog 46, whereupon the rockshaft 37, under the influence of a coil tension spring 49 connected to the frame and to arm 17, and the weight of the truck transmitted through the toggle and connecting instrumentalities, rapidly returns to original position. The depending apron 50 on the truck serves as a stop for extension 39 on rockshaft 37.

The foot block 8, as illustrated in Figs. 1, 2, 4 and 5, is in the form of an integral casting. However, it may be found necessary to sharpen or otherwise alter the shape of projections 9 and with this purpose in mind I have provided an alternative form of foot block illustrated in Fig. 9 and consisting of separate plates 51 spaced by suitable collars or washers 52 to provide a passage for the lower end portion 7 on standard 6. The said plates and spacers are secured in assembled relation by pivot pins 14 in a manner which will be readily understood and either one or both of the plates are accordingly readily removed and replaced in the event that it becomes necessary to grind the projections of the same or in the event a defective plate requires replacement. Obviously the modified form of foot block may be substituted for the integral foot blocks in either modification as disclosed in Fig. 1 or in Fig. 4.

From the foregoing description of the modified embodiment, it will be seen that a structure is provided having not only the advantageous characteristics of that illustrated in Fig. 3, but possessing the further advantage of being readily operable either from an end or side of the truck due to the multiplication of power provided by the linkage illustrated. Furthermore, the device is readily and quickly released from latched or locked position by the operator without subjecting himself to the danger of being struck or pinched.

I have illustrated and described my improvements in embodiments which I have found highly desirable. As stated, I have shown only such parts of a truck as seemed desirable to illustrate the application of my invention. I have not attempted to illustrate and describe various embodiments and adaptations of my invention as it is believed that this disclosure will enable those skilled in the art to embody my improvements as may be desired.

Having thus described my invention what I claim as new and desire to secure by Letters Patent is:

1. The combination with a truck and its carrying wheels, of a jack operatively associated with one of the carrying wheels and comprising a standard carried by said body, a foot block vertically slidable on said standard, opposed pairs of toggle links, the links of the pairs being pivotally connected to each other, one link of each pair being pivotally mounted on the standard and the other link of each pair to said foot block, a rockshaft having oppositely disposed arms, an actuating link connecting each rockshaft arm to one of the toggle link connecting pivots whereby the toggles are simultaneously actuated from said rockshaft, a spring connected to one of the arms on said rockshaft to urge the same in toggle breaking direction, a spring actuated holding dog, said rockshaft being provided with a keeper with which said holding dog coacts to lock the jack in its actuated position, a push lever at one end of said body and a pull lever at the other end thereof, and connecting links for said levers to said locking dog whereby the locking dog may be released from either end of the truck body.

2. The combination with a truck and its carrying wheels, of a jack operatively associated with one of the carrying wheels and comprising a standard carried by said body, a foot block vertically slidable on said standard, opposed pairs of toggle links, the links of the pairs being pivotally connected to each other, one link of each pair being pivotally mounted on the standard and the other link of each pair to said foot block, a rockshaft having oppositely disposed arms, an actuating link connecting each rockshaft arm to one of the toggle link connecting pivots whereby the toggles are simultaneously actuated from said rockshaft, a spring connected to one of the arms on said rockshaft to urge the same in toggle breaking direction, a spring actuated holding dog, said rockshaft being provided with a keeper with which said holding dog coacts to lock the jack in its actuated position, and means for manually releasing said dog.

3. The combination with a truck and its carrying wheels, of a jack operatively associated with one of the carrying wheels and comprising a standard carried by said body, a foot block vertically slidable on said standard, and opposed pairs of toggle links, the links of the pairs being pivotally connected to each other, one link of each pair being pivotally mounted on the standard and the other link of each pair to said foot block, a rockshaft having oppositely disposed arms, an actuating link connecting each rockshaft arm to one of the toggle link connecting pivots whereby the toggles for said one carrying wheel are simultaneously actuated from said rockshaft, a spring acting to urge the rockshaft in toggle breaking directions, a spring actuated holding dog for said rockshaft, and manual releasing means for said dog.

4. The combination with a truck and its carrying wheels, of a jack operatively associated with one of the carrying wheels and comprising a standard carried by said body, a foot block vertically slidable on said standard, and opposed pairs of toggle links, the links of the pairs being pivotally connected to each other, one link of each pair being pivotally mounted on the standard and the other link of each pair to said foot block, a rockshaft having oppositely disposed arms, and an actuating link connecting each rockshaft arm to one of the toggle link connecting pivots whereby the toggles are simultaneously actuated from said rockshaft.

5. The combination with a truck and its carrying wheels, of a jack operatively associated with one of the carrying wheels and comprising a vertically movable foot block, opposed pairs of toggle links, the links of the pairs being pivotally connected to each other, one link of each pair being connected to the body and the other link of each pair to said foot block, an actuating link connected to each toggle, a rockshaft to which said actuating links are connected so that the links are moved in opposite directions on the actuation of the rockshaft, a spring acting to simultaneously break the toggles, a spring actuated holding dog, said rockshaft being provided with a keeper with which said holding dog coacts to lock the jack in its actuated position, a push lever at one end of said truck and a pull lever at the other end thereof, and connecting links for said levers to said locking dog whereby the locking dog may be released from either end of the truck body.

6. The combination with a truck and its carrying wheels, of a jack operatively associated with one of the carrying wheels and comprising a vertically movable footblock, opposed pairs of toggle links, the links of the pairs being pivotally connected to each other, one link of each pair being connected to the body and the other link of each pair to said foot block, an actuating link connected to each toggle, a rockshaft to which said actuating links are connected so that the links are moved in opposite directions on the actuation of the rockshaft, a spring acting to simultaneously break the toggles, a spring actuated holding dog, said rockshaft being provided with a keeper with which said holding dog coacts to lock the jack in its actuated position, and means for manually releasing said dog.

7. The combination with a truck and its carrying wheels, of a jack operatively associated with one of the carrying wheels and comprising a vertically movable footblock, opposed pairs of toggle links, the links of the pairs being pivotally connected to each other, one link of each pair being connected to the body and the other link of each pair to said foot block, an actuating link connected to each toggle, a rockshaft to which said actuating links are connected so that the links are moved in opposite directions on the actuation of the rockshaft, a spring acting to simultaneously break the toggles, a spring actuated holding dog, and manual releasing means for said dog.

8. The combination with a truck and its carrying wheels, of a jack operatively associated with one of the carrying wheels and comprising a vertically movable footblock, a pair of toggle links, the links being pivotally connected to each other, one link being connected to the body and the other link being connected to said footblock, an actuating link extending longitudinally of the truck and connected to the pivot point of the toggle links, and a rockshaft extending transversely in a direction from side to side of said truck and to which said actuating link is connected.

9. In combination with the wheels of a truck and means for raising and lowering said wheels and truck comprising a foot block and toggle means for actuating said block, a rockshaft pivotally mounted on said truck, means connecting said rockshaft with said toggle means, means for actuating said rockshaft comprising a second relatively short rockshaft and operating connections from the same to the first named rockshaft, means for pivotally mounting said second rockshaft on said truck, an extension integral with said second rockshaft for actuating the same, means for locking said second rockshaft in actuated position comprising a pivoted spring urged latch keeper, a latch dog on said rockshaft adapted to engage said keeper to hold said second rockshaft from return movement, and means on said keeper for withdrawing the same to release said dog.

10. In combination with the wheels of a truck and means for raising and lowering said wheels and truck comprising a foot block and toggle means for actuating said block, a rockshaft extending transversely in a direction from side to side of said truck and pivotally mounted on said truck, means extending longitudinally of the truck for connecting said rockshaft with said toggle means, means for actuating said rockshaft comprising an extension integral with said rockshaft for actuating the same, means for locking said rockshaft in toggle actuating position comprising a pivoted spring urged latch keeper, and a latch dog on said rockshaft adapted to engage said keeper to hold said rockshaft from return movement.

11. In combination with a truck having wheels and means for raising said truck and wheels comprising a foot block, toggle means for actuating said foot block, and means for actuating said toggle means from a point on said truck distant from the toggle means comprising a link extending in a direction from front to rear and substantially of the length of the truck and connected to said toggle means, and means for actuating said link comprising a stub rockshaft pivotally mounted on said truck and operatively connected to the link, said stub shaft having provision for rocking the same from a plurality of positions relative to the truck, a latch dog on said stub shaft, and a pivoted latch keeper releasably engageable with said latch dog to hold the stub shaft in actuated position.

12. In combination with a truck having wheels and means for raising said truck and wheels comprising a foot block, means for actuating said foot block, means for actuating said means from a point on said truck distant therefrom comprising a link extending in a direction from front to rear and substantially of the length of the truck and connected to said actuating means, means for actuating said link comprising a rockshaft pivotally mounted on said truck and operatively connected to the link, said shaft having provision for rocking the same from a plurality of positions relative to the truck, a latch dog on said shaft, and a latch keeper releasably engageable with said latch dog to hold the shaft in actuated position.

EMERY G. ULRICH.